(12) United States Patent
Zhou

(10) Patent No.: US 11,359,758 B2
(45) Date of Patent: Jun. 14, 2022

(54) SECTIONAL-TYPE HIGH WEAR-RESISTANT DOUBLE-LAYER STRAIGHT TUBE AND A METHOD FOR PREPARING THE SAME

(71) Applicant: Zhaohui Zhou, Changsha (CN)

(72) Inventor: Zhaohui Zhou, Changsha (CN)

( * ) Notice: Subject to any disclaimer, the term of this patent is extended or adjusted under 35 U.S.C. 154(b) by 501 days.

(21) Appl. No.: 16/496,093

(22) PCT Filed: Apr. 12, 2018

(86) PCT No.: PCT/CN2018/082777
§ 371 (c)(1),
(2) Date: Sep. 20, 2019

(87) PCT Pub. No.: WO2018/171811
PCT Pub. Date: Sep. 27, 2018

(65) Prior Publication Data
US 2021/0108755 A1  Apr. 15, 2021

(30) Foreign Application Priority Data

Mar. 21, 2017 (CN) .......................... 201710169064.8
Mar. 21, 2017 (CN) .......................... 201720275791.8
(Continued)

(51) Int. Cl.
*F16L 57/06* (2006.01)
*E04G 21/04* (2006.01)
(Continued)

(52) U.S. Cl.
CPC .......... *F16L 57/06* (2013.01); *E04G 21/0436* (2013.01); *B65G 53/523* (2013.01); *F16L 9/02* (2013.01); *F16L 43/00* (2013.01)

(58) Field of Classification Search
CPC ... F16L 57/06; F16L 9/02; F16L 43/00; E04G 21/0436; B65G 53/523
See application file for complete search history.

(56) References Cited

U.S. PATENT DOCUMENTS 4,633,913 A   1/1987   Carty et al.
4,653,777 A * 3/1987   Kawatsu ............... B65G 53/523
                                                    285/55
(Continued)

FOREIGN PATENT DOCUMENTS

CN   102494218 A   6/2012
CN   102563222 A   7/2012
(Continued)

OTHER PUBLICATIONS

International Search Report for PCT/CN2018/082777 (PCT/ISA/210) dated Jul. 3, 2018, with English translation.

*Primary Examiner* — James M Hewitt, II
(74) *Attorney, Agent, or Firm* — Birch, Stewart, Kolasch & Birch, LLP

(57) ABSTRACT

In a sectional-type high wear-resistant double-layer straight tube and a method for preparing the same, the double-layer straight tube includes a protective outer tube and a sectional-type wear-resistant inner tube. The protective outer tube is nested outside of the sectional-type wear-resistant inner tube; the sectional-type wear-resistant inner tube includes at least two wear-resistant inner tube sections; and the wear-resistant inner tube sections are connected sequentially. The sectional-type wear-resistant inner tube at least includes a left inner tube section, a right inner tube section, and one or more middle inner tube section. The wear-resistant straight tube can greatly prolong the service life of the pipeline so that the cost performance of the pipeline is increased by more than a few times. It would also easily achieve mass production, the quality is stable and reliable, and the safety performance is high.

10 Claims, 6 Drawing Sheets

(30) Foreign Application Priority Data

May 22, 2017 (CN) .......................... 201720572001.2
Feb. 9, 2018 (CN) .......................... 201810135100.3
Apr. 4, 2018 (CN) .......................... 201810300656.3

(51) Int. Cl.
*B65G 53/52* (2006.01)
*F16L 9/02* (2006.01)
*F16L 43/00* (2006.01)

(56) References Cited

U.S. PATENT DOCUMENTS

| | | | | |
|---|---|---|---|---|
| 6,467,812 B1 * | 10/2002 | Klemm | .................. | F16L 57/06 |
| | | | | 285/55 |
| 7,967,031 B2 * | 6/2011 | Esser | ...................... | F16L 57/06 |
| | | | | 138/155 |

FOREIGN PATENT DOCUMENTS

| | | | |
|---|---|---|---|
| CN | 202452011 U | | 9/2012 |
| CN | 103411047 A | | 11/2013 |
| CN | 105003758 A | | 10/2015 |
| CN | 106885061 A | | 6/2017 |
| CN | 206846104 U | | 1/2018 |
| CN | 206988624 U | | 2/2018 |
| DE | 102015111458 A1 | * | 1/2017 |
| DE | 202017102140 U1 | * | 6/2017 |

* cited by examiner

SECTIONAL-TYPE HIGH WEAR-RESISTANT DOUBLE-LAYER STRAIGHT TUBE AND A METHOD FOR PREPARING THE SAME

RELATED APPLICATION

The present application claims the priority of the China Patent application No. 2017101690648 titled of "A heterogeneous sectional-type high wear-resistant double-layer straight tube for concrete transport" filed on Mar. 21, 2017; the priority of the China Patent application No. 2017202757918 titled of "A heterogeneous sectional-type high wear-resistant double-layer tube for concrete transport" filed on Mar. 21, 2017; the priority of the China Patent application No. 2017205720012 titled of "A wear-resistant straight tube that eliminates the effects of welding" filed on May 22, 2017; the priority of the China Patent application No. 2018101351003 titled of "A wear-resistant tube preparation method based on high-carbon, high-chromium steel" filed on Feb. 9, 2018; and the priority of the China Patent application No. 2018103006563 titled of "A wear-resistant tube preparation method to improve the finished product rate" filed on Apr. 4, 2018.

FIELD OF THE INVENTION

The present invention relates to the field of wear-resistant tube preparation, in particular, a high wear-resistant tube preparation method and its corresponding wear-resistant tube.

BACKGROUND

With the development of the construction industry, the use of concrete pump trucks is becoming more and more common.

Concrete pump trucks have very high wear-resistant requirements for concrete pumping tubes. The existing conventional concrete wear-resistant pumping tubes are able to pump only about 5000-8000 cubic meters concrete and need to be replaced almost every month.

Some manufacturers have adopted ways to increase the wall thickness of wear-resistant tubes in order to increase its service life. However, the weight of the wear-resistant tube itself is conducted by the concrete pump truck extension bracket, which results in a huge torque that can easily cause collapse. In order to increase wear resistance, material density of concrete pumping tube is often very high, for each increase of 1 mm of tube wall thickness, its weight will be greatly increased, considering its length of several tens of meters, hundreds of meters, its weight and torque cannot be underestimated.

Therefore, to provide high wear resistance, light weight, thin tube wall wear-resistant tube has been the hard-to-achieve goal in the field of wear-resistant tube preparation. Because of light weight, wear-resistant tube with thin wall often has poor wear resistance, and increasing wear resistance will inevitably increase the weight of the tube wall.

Moreover, normally, the wear-resistant tube in prior art also has another problem, which is the ununiformity of wear in various parts. Uneven wear is able to bring not only wear problem, but also bring more drag force and increase wear and other problems.

In addition, aiming at this problem, the applicant has previously proposed a high-carbon high-chromium steel double-layer internal section wear-resistant tube, however, this wear-resistant tube has substandard products, the service life of which will be significantly lower than that of genuine products.

SUMMARY

The invention mainly solves three problems: (1) provides a wear-resistant straight tube with one of the following characteristics: high wear resistance, light weight, thin tube wall and high wear uniformity; (2) the use of high carbon and high chromium steel in wear-resistant pipes is realized, and (3) the problem of the sub-product rate of sectioned-type wear-resistant pipes is solved.

Regarding the first problem, the present invention provides a sectional-type high wear-resistant double-layer straight tube for concrete transporting, comprising: protective outer tube, sectional-type wear-resistant inner tube, wherein, the protective outer tube is positioned outside of the sectional-type wear-resistant inner tube, the sectional-type wear-resistant inner tube comprises at least two wear-resistant inner tube sections, and the wear-resistant inner tube sections are connected to each other sequentially.

Preferably, the sectional-type wear-resistant inner tube comprises at least a left end inner tube section, a right end inner tube section and one or more central inner tube sections, and the material of at least one of the three kinds of wear-resistant inner tubes is different from other inner tube materials. Preferably, at least one of the inner tube sections in the left end and the inner tube section at the right end is better than other parts of the inner tube section.

Preferably, there are filling channels between adjacent inner tube sections at their junction, which is used to fill the gap between the outer tube and the inner tube.

Preferably, the double-layer straight tube also includes wear-resistant connection flanges, which are arranged at two ends of the double-layer straight tube.

Preferably, the double-layer straight tube also includes shock-absorbing filling, chamber, a vibration-absorbing filling layer therein is used to protect the gap between the outer tube and the sectional-type wear-resistant inner tube after installation.

Preferably, the double-layer straight tube is used for a concrete pump truck, and used as a pumping tube for concrete.

Preferably, the shock-absorbing, filling chamber is filled with filling materials, which is water-soluble filler. The water-soluble fillers will fuse together with concrete after the tube is used to pump concrete, and then become solidified. This way is adopted because the general filling material even if the use of porous material, it is possible that the concrete filling is not complete, resulting in the shock absorption filling chamber is not completely filled with concrete, the fixed and binding effect of concrete in the chamber is affected. With such kind of filler, it can solve this problem.

Therefore, the first problem is mainly solved by using the structure of the outer whole, internal section, and preferably using different materials for the end and the middle tube. Regarding the second problem, during the ongoing research and development experiments on wear-resistant tubes, the applicant found that high-carbon, high-chromium steel (especially high-carbon high-chromium bearing steel) was a high wear-resistant material, so attempted to introduce high-carbon, high-chromium steel, such as GCr15, into wear-resistant tubes.

During the research and development process, the applicant noted that the high carbon and high chromium material has excellent wear resistance, but it has high hardness and brittleness, inducing that tube of thin wall can only be made by casting. At present, it has very high cost to cast the inner tube using high chromium cast iron material. Taking the thickness of 2-5 mm as an example, the cost per meter is about RMB 600 or more. For example, the process is complex and the cost is also very high for making the inner tube by using high carbon high-chromium bearing steel Gr15, through centrifugal casting method. Thus, the tube by casting cannot mass production and marketing.

The current approach is to use high-chromium cast iron at the end of the tube, because usually, the end wears much more severe than the middle part. By using the wear-resistant tube with a high carbon high-chromium material wear sleeve at the ends, it does result in a significant improvement in wear resistance of the end parts, but at the same time, the problem is that because of the high cost of high-chromium cast iron manufacturing tube, The majority of the length of the wear-resistant tube can only be used in less expensive wear resistant materials, such as steel No. 60. Therefore, also brought the problem of uneven wear, the middle part made of No. 60 steel wear seriously, its wear will bring changes in the shape of the tube wall, that is, and the introduction of wear unevenness will further aggravate wear.

The applicant learned in the experimental research on high carbon high-chromium steel straight tube that in this field of high carbon high-chromium steel existence of such a consensus that high carbon high-chromium steel "high brittleness, poor welding performance" "cannot roll the plate." This is not to say that the technical staff in the art believe that high carbon high-chromium steel cannot be rolled and welded at all, but with the existing equipment of the existing major steel mills on high carbon high-chromium steel, the width of plate by rolling (or forging and pressing) is limited, high carbon high-chromium steel rolling plate width generally cannot exceed 300 mm.

At present, the diameter of the wear-resistant tube of the concrete pump truck is 110-130 mm, which has a uniform standard, the tube over-rules cannot be matched with the pump truck. The diameter of wear-resistant tube of the concrete pump truck should reach 122 mm to 124 mm, and thus if a tube is bend from a plate, the width of the plate needs to reach at least 400 mm, and the current production capacity of the existing steel mill cannot produce a 400 mm width of high carbon high-chromium steel plate.

The high carbon high-chromium steels mentioned in this application include: alloy steel with a carbon content of more than 0.8% and a chromium content of more than 1.3%, and the high carbon high-chromium steel referred to in this application is preferably high carbon high-chromium bearing steel such as GCr15.

Therefore, the inventor of this application has taken a different approach and proposed a method of the present invention, which can not only achieve the preparation of wear-resistant tubes on the basis of existing high-carbon high-chromium steel plates, without increasing costs, and without the need for casting tubes.

Preferably, the preparation method of the present invention uses high carbon and high chromium steel to prepare the inner tube, which includes the following Steps:

Step S1, preparing the outer protective tube;
Step S2, preparing the inner wear-resistant tube, wherein, Step S2 includes:
  Step S2.1, preparing or acquiring of high carbon high chromium steel plates;
  Step S2.2, heat treating of the steel plates of high carbon and high chromium steel;
  Step S2.3, cutting the steel plates treated into a predetermined size one;
  Step S2.4, bending a predetermined size steel plate to a ring-shape using a bending machine with its long edge used as its circumference, and its short edge for the length of the tube;
  Step S2.5, welding the ends of predetermined size steel plate together, as a section of the inner wear-resistant tube, repeat Steps S2.1-S2.5, preparing multi-section inner wear-resistant tube,
Step S3, installing the multi-section inner wear-resistant tube in the outer protective tube.

Preferably, Step S2 also includes casting high-chromium cast iron or high-carbon high-chromium steel tube, with a length between 10-50 mm, using as end parts wear-resistant tube. That is using high-carbon high-chromium casted tube as the end of the inner wear-resistant tube wear-resistant tube, and high-carbon high-chromium steel bended tube as middle wear-resistant tube of the inner wear-resistant tube.

Preferably, the wear-resistant tube preparation method also includes the following Steps:

Step S4, installing wear resistant flanges at both ends of the outer protective tube, wherein, each of the wear resistant flanges includes an outer protective flange and an inner wear resistant layer.

Preferably, the sum of the thickness of the tube wall of the outer protective tube and the inner wear-resistant tube is less than or equal to 5.5 mm, preferably less than or equal to 4.5 mm.

Preferably, the outer protective tube wall thickness is 1.6-2.2 mm; the inner wear-resistant tube wall thickness is 2.4-3.5 mm.

The high carbon high chromium steel refers to the alloy steel with a carbon content of more than 0.8 and a chromium content of more than 1.3.

Preferably, above step S3 involves pressing the multi-section inner wear-resistant tube into the outer protective tube from one end of the outer protective tube in turn.

Preferably, above step S3 involves a pre-treatment of the inner wear-resistant tube before pressing the multi-section inner wear-resistant tube from one end of the outer protective tube into the outer protective tube in turn. Preferably, the pre-treatment refers to brushing a layer of cement mud or concrete on the outside of the inner wear-resistant tube.

Preferably, the method also includes the preparation of the inner wear-resistant tube so that it includes at least the left end inner tube section, the right end inner tube section and one or more central inner tube sections.

Preferably, the method also includes: for the left end inner tube section and the right end inner tube section, casting a tube with high carbon high-chromium cast iron in the length of 20-50 mm; and for the central inner tube section, rolling or bending tubes with high carbon high-chromium steel with length of 150-350 mm, preferably 150 mm-280 mm.

As mentioned above, it is difficult for steel mills or factory to produce high-carbon, high-chromium steel (e.g., bearing steel GCr15) with a width of 400 mm, or billions of RMB Yuan needs be invested in retrofitting and upgrading if such sheets are to be produced.

Therefore, in the present invention, a width of less than 300 mm of the plate is used and cut, with the length of 380-400 mm steel plate, the direction of the trimmed steel plate is adjusted, i.e., the length of the cut plate is used as a circumference, the width of the plate is used as the length of the tube, a pipe rolling machine is used to bend it into a tube.

It not only ensures the preparation of high carbon and high-chromium alloy steel tube, but also does not need to modify forging device.

The invention finds a different way and solves the problem that people can only use casting high-chromium cast iron tube in the preparation process of wear-resistant tube, and realizes the effective application of high carbon high-chromium steel in wear-resistant tube. Due to the use of cast high-chromium cast iron or high carbon high-chromium steel tube as the end sections, rolled high carbon high-chromium steel tube as the middle sections, so that the uniformity of wear resistance is significantly higher than the internal use of 60 steel, and greatly extends the service life.

Regarding the third problem, while the applicant tested the product made in the embodiment 2, it found that the product in the embodiment 2 has a certain substandard product rate, the service life of which will be greatly reduced. However, the applicant has been unable to find the reason for the formation of the substandard products, which are same as good ones in the appearance, but in the course of testing or use, the life is significantly shorter than the good product.

Through repeated research on good and substandard products, the applicant finally found the reason for the formation of the substandard product, the applicant found that the main reason for the appearance of the defective product and affect the life, the main reason is due to the use of multi-section internal tube, in the internal tube installed in the outer tube, even if all the external tube and internal tube are standardized production, The resulted tube parts will inevitably have a certain error and there are reserved filling gaps between the external tube and the inner tube, which leads to misalignment of the adjacent sections of inner tube, inducing the appearance of steps between adjacent sections of inner tube, and the steps will significantly increase the concrete resistance and concrete wear on the inner tube. If it is a single step, it will not have a great impact on its service life. But if a few Steps accumulate or stagger will lead to a shortened service life, inducing the tube becomes a substandard product. Because the outer tube and the inner tube are standard pieces, the inventor never thought that this assembly error will lead to a substandard product, so this problem has troubled the technician for a long time until the crux of the problem.

Although the key point of the problem was found, but to solve the problem is not easy, because the problem is caused by assembly error and induced by separating the inner tube as multiple sections. The way to reduce the error can only be reducing the gap between the outer tube and the inner tube, and once this gap is narrowed, the installation of the inner tube and the outer tube will becomes more difficult, and the filling between the outer tube and the inner tube cannot be completed.

Everything comes to him who waits. The applicant had made a variety of attempts and efforts, but failed, finally found a method which do not need to reduce the gap between the external tube and the inner tube, and can ensure that the external tube and the inner tube between the filling, at the same time, as far as possible to reduce the probability of the occurrence of substandard products installation method.

Specifically, the applicant has improved the process of installation of the multi-section inner wear-resistant tube into the outer protective tube of Step S3, which is divided into:

Step S3-1: taking a predetermined number of inner wear-resistant tubes (e.g. 2, 3 or 4, etc.); bonding a second inner tube section with a first inner tube section; step S3-2: coating adhesive on end surface of a first inner wear-resistant tube section; step S3-3, bonding a second inner wear-resistant tube section with the first inner wear-resistant tube section; repeating Step S3-2 and Step S3-3 to bond and form a inner wear-resistant tube group, the surface of the sections in one inner wear-resistant tube group is aligned with each other; and repeating above steps to form several inner wear-resistant tube groups. Then, several inner wear-resistant tube groups are loaded from one end into the outer protective tube. This implementation method can significantly reduce the substandard product rate and improve the life of wear-resistant tubes.

Preferably, in Step S3-2, the procedure of coating adhesive is applied along the end surface of the wear-resistant tube along the inner layer, adhesive thickness of 0.1-1 mm, preferably 0.1-0.3 mm, for example, coating 4 points at the end surface along the diagonal, between the points leaving a predetermined gap between the points, which can ensure that the wear-resistant inner tube of the inner surface is aligned with each other, and also ensure the concrete filling between the outer tube and the inner tube.

In another implementation, the applicant makes the following improvements to Step S3, which step is divided into Step S3-1: taking a predetermined number of inner wear-resistant tubes (e.g. 2, 3 or 4, etc.); Bonding a second inner tube section with a first inner tube section, repeating Step S3-2 and Step S3-3 to bond and form inner tube section groups, in each inner tube section groups, one section surface is aligned with others; Inserting an inner tube section groups into the protective outer tube, wherein, when an inner tube section group is inserted into a part of the protective outer tube, the end of the exposed part of the inner tube section group is coated with adhesive (adhesive for bonding steel). Another inner tube section group is then installed on the inner tube section group coated with adhesive, keeping the inner surfaces of the two inner tube section groups aligned with each other. This implementation can significantly reduce the defective rate (down to less than 1%) and increase the life of the wear-resistant tube.

In another preferred implementation, the applicant provides a wear-resistant straight tube. In the wear-resistant inner tube, each two inner segments in the middle of the inner tube are intermittent bonded with each other through adhesive, i.e., adhesive does not fully cover the end of adjacent inner tube sections, but point coating the end of one of the inner tube sections (alternatively, coating on the end of two adjacent inner tube sections), to achieve bonding of the adjacent inner tube sections. When bonding adjacent inner tube sections, people can secure the two inner tube sections by placing the inner tube section on a column matching the inner surface of them, then applying glue to the end of one inner tube section, and then attaching the other one to the cylinder, so as to ensure that the inner surface of the two inner tube sections are aligned with each other.

Preferably, the inner tube section at the end of can also be bonded by adhesive.

The invention designs a multi-section structure wear-resistant layer, and in the preferred embodiment, the end of the wear-resistant tube is designed as a casted tube, while the middle wear-resistant tube is designed as a high-carbon high-chromium rolled tube, which not only reduces the cost, but also effectively extends the service life of the tube, eliminating the length effect of the wear-resistant inner tube in the casting process, bring a lot of convenience on the installation of wear-resistant tube. Furthermore, it does not affect the life of the straight tube, especially heterogeneous design, by setting better wear-resistant end tube, to solve the problem of wear resistance at the straight tube port.

In addition, the preferred embodiment of the present invention, by means of the installation, i.e., a special way to glue the inner tube section, ensures that the inner surfaces of the inner tube sections are aligned with each other, to significantly reduce the chance of wear-resistant tube residue.

DETAILED DESCRIPTION OF EMBODIMENT

The present invention is described in detail as follows, in combination of drawings and embodiments, but the scope of protection of the present invention is not limited to the scope described by the embodiment.

Embodiment 1

Figure 1:
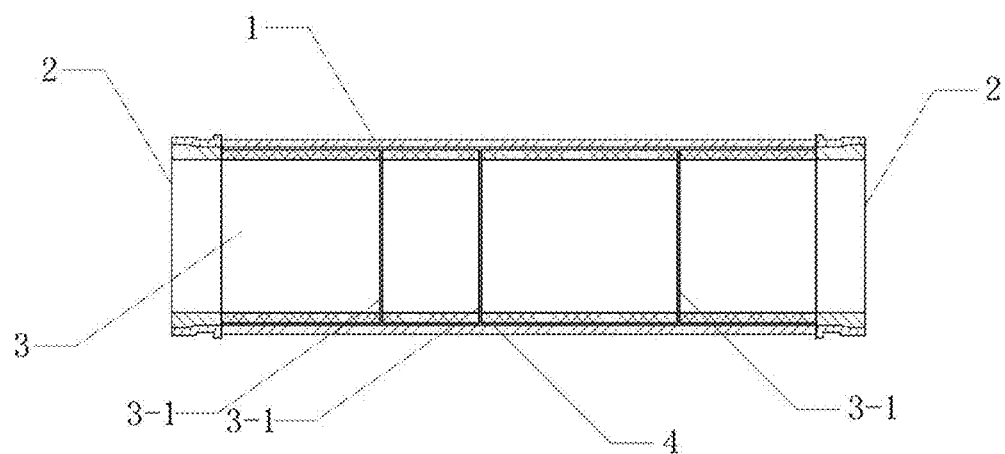
FIG. 1 is a structural diagram of the double-layer wear-resistant straight tube in embodiment 1 of the present invention.
Figure 2:
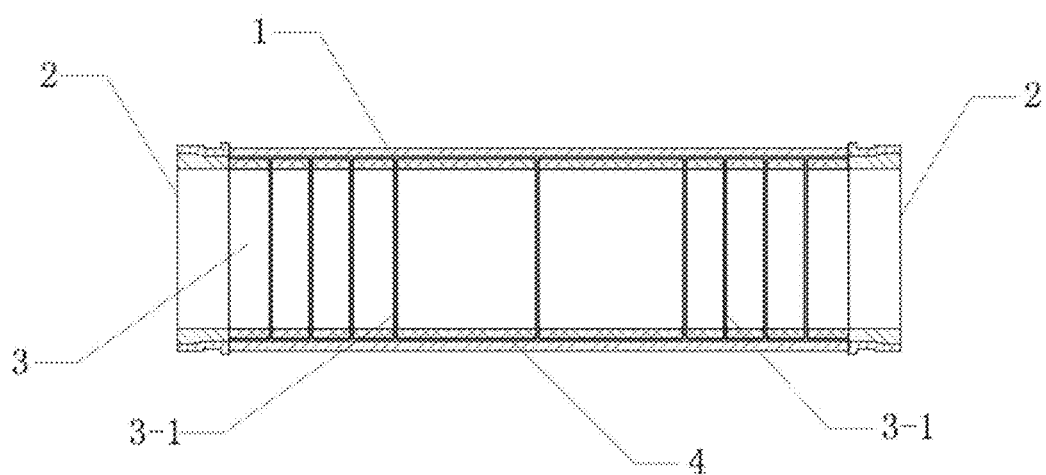
FIG. 2 is a structural schematic diagram of another implementation of embodiment 1 of the present invention.

As shown in FIG. 1, the sectional-type high wear-resistant double-layer straight tube for concrete pump truck of this embodiment consists of a protective outer tube 1, wear-resistant flanges 2, a sectional-type wear-resistant inner tube 3 and shock-absorbing filling chamber 4. In this embodiment, the protective outer tube 1 is a welded steel tube or seamless steel tube; the sectional-type wear-resistant inner tube 3 is installed inside the protective outer tube 1, the wear-resistant connection flanges 2 are at two ends of the protection of the outer tube 1, sectional-type wear-resistant inner tube 3 through welding, the shock-absorbing filling chamber 4 is used to protect the outer tube 1 and sectional-type wear-resistant inner tube 3 after installation before the formation of the sandwich layer.

The wear-resistant flange 2 of the invention comprises a flange and a wear-resistant sleeve.

Preferably, sectional-type wear-resistant inner tube 3 comprises a left end wear-resistant inner tube section, middle wear-resistant inner tube sections and a right end wear-resistant inner tube section, there are filling channels 3-1, each of which is between two sections of the inner tube.

Preferably, the three kinds of inner tube sections in sectional-type wear-resistant inner tube 3 are heterogeneous tubes, that is, at least one of the inner tube sections is made of material different from others; the left end wear-resistant inner tube section is made of the same material as the right end wear-resistant inner tube section.

The filling channel 3-1 of the invention refers to the reserved seam formed after the installation of adjacent two-stage wear-resistant inner tube sections, which is used to absorb the active filling of the filling chamber 4. Shock-absorbing filling chamber 4 can be pre-filled and then replenished with concrete.

Embodiment 2

Figure 3:
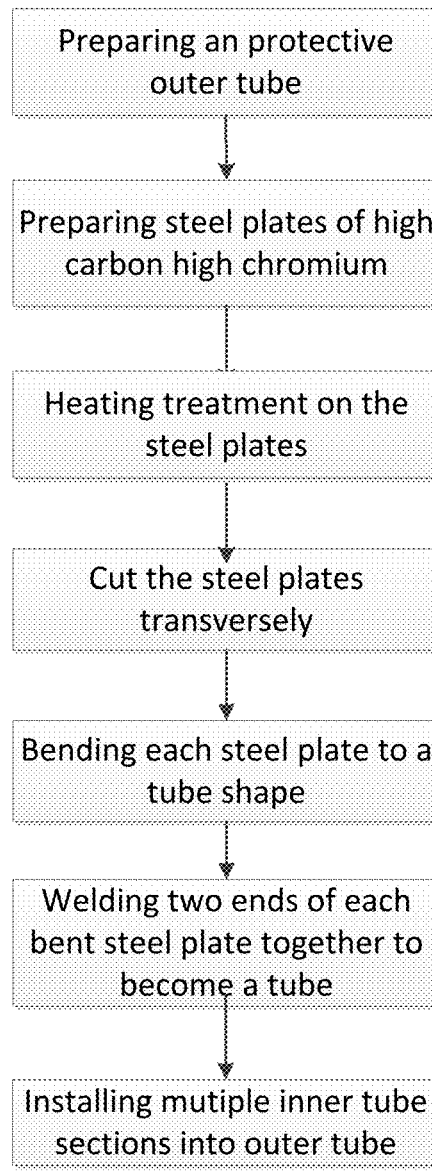
FIG. 3 is an indicative flow chart of the method in embodiment 2 of the present invention.
Figure 4:
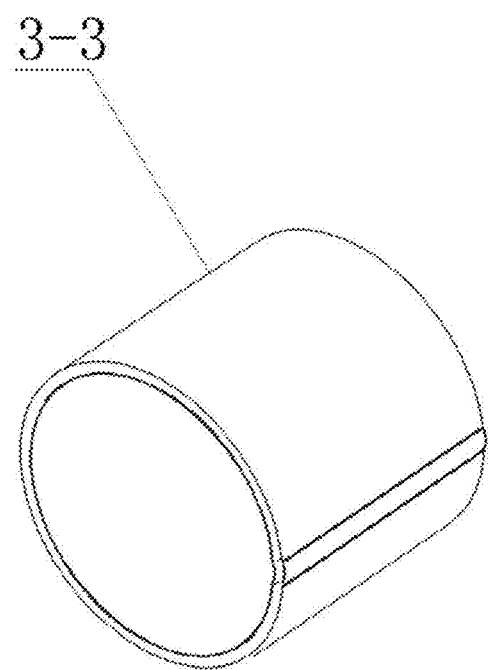
FIG. 4 is a structure diagram after the bending of a high-carbon high-chromium steel plate in the inner tube section preparation process.
Figure 5:
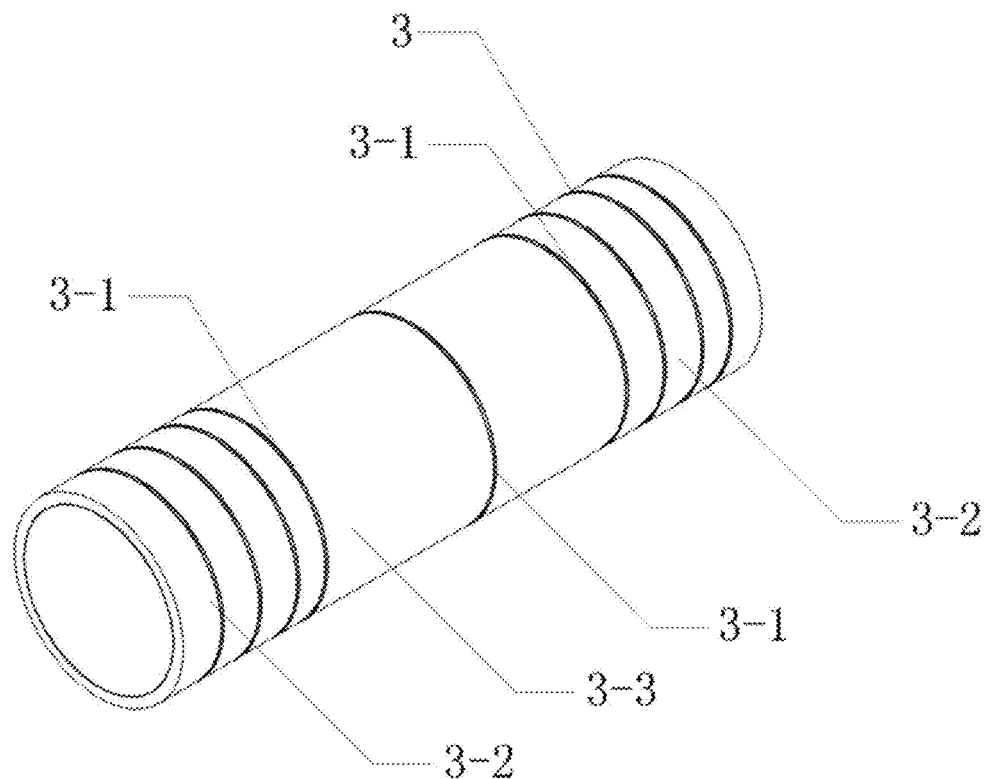
FIG. 5 is a structural diagram of the inner wear-resistant tube in embodiment 2 of the present invention, in which the two ends adopt 20-50 mm cast tube, and its middle adopts 200-500 mm high carbon high-chromium steel bent tube.
Figure 6:
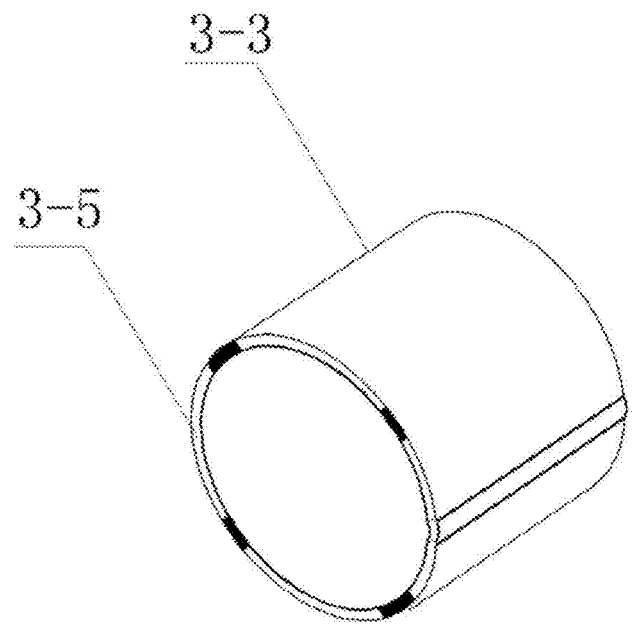
FIG. 6 is a diagram of the point coating of the central wear-resistant tube in embodiment 3 of the present invention.
Figure 7:
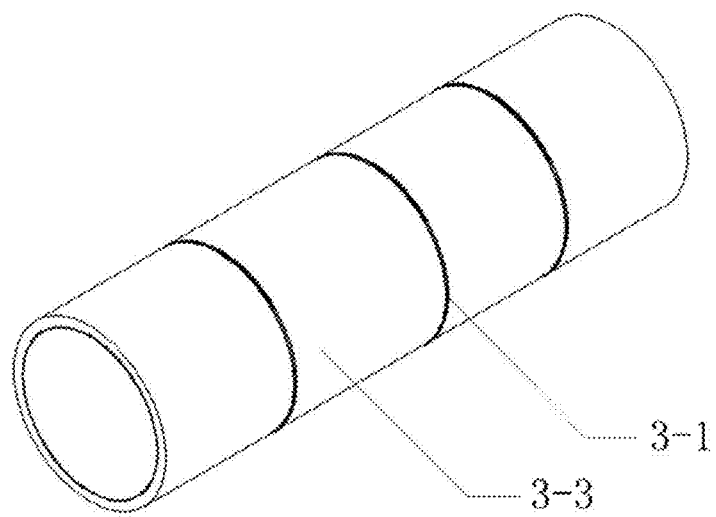
FIG. 7 is a structural schematic diagram of the wear-resistant inner tube section group in embodiment 3 of the present invention.
Figure 8:
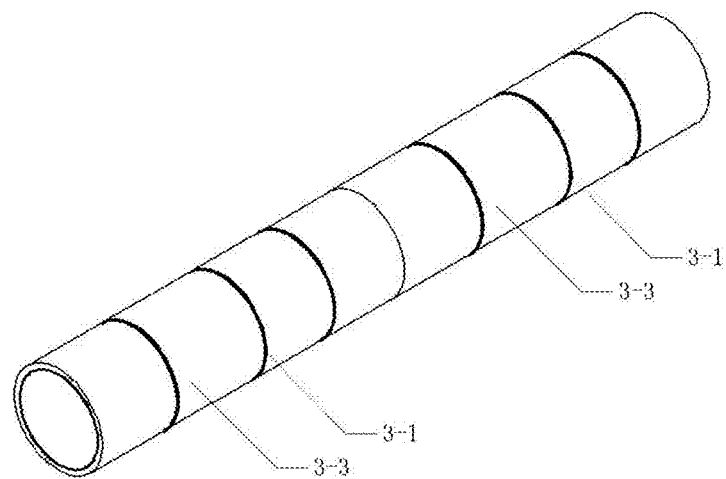
FIG. 8 is the structural schematic diagram of two wear-resistant inner tube section groups in series in embodiment 3 of the present invention.

As shown in FIG. 3, the method of this embodiment includes the following Steps:

Step S1, preparation of outer protective tube.

Step S2, preparation of the inner wear-resistant tube.

This is the core step of the present invention; the preparation process of the inner tube also includes the following detailed steps:

Preparing or obtaining sheets of high-carbon, high-chromium steel.

After steel ingots are produced, they are needed to be processed into target work piece; usually the main processing methods are casting, forging, rolling and so on.

In the production process of steel, the cost of casting is about twice the forging. However, high carbon high-chromium steel, such as GCr15, with high hardness, is difficult to be forged and rolled and difficult for steel mills to produce more than 300 mm width of steel plate, once the width of more than 300 mm will appear high scrap rate, rolling cracking and other quality problems.

Based on this situation, it is difficult to apply the forging or rolling plate of high carbon and high chromium steel to the preparation of tubes. High-carbon, high-chromium material tubes used in existing wear-resistant tubes, such as high-chromium cast iron tubes or high-carbon high-chromium steel tubes, are cast and molded at high cost.

The inventor of this application in the continuous experiment of high carbon high-chromium steel sheet found that high carbon high-chromium steel plate is not completely unable to be rolled (bent) into tubes, but need to be rolled in a special way, i.e., be heat treatment before the roll-up be weld using hot-melt welding after rolled-up.

First, the steel plate can be purchased from a steel mill, and then the steel plate is heat treated, the heat treatment is done by spheroidize annealing, the temperature of the spheroidize annealing at 750-800° C.

After the balling annealing, the performance of the plate can meet the requirement of rolling machine. Then, the heat-treated steel plate is cut along its length direction; each section length between 380-400 mm, the length of each section is the same. Next, the steel plate is bent into a tubular shape using a rolling machine with its long edge for the circumference of the tube, with its short edge for the length of the tube. Then, the steel tube bent is weld by hot-melt welding, heating its ends to become melt state, so that the two ends of the bent steel welded together, as a section of the inner wear-resistant tube. Repeating this step and preparing multiple sections of inner wear-resistant tube. In this embodiment, welding methods such as arc welding or laser welding are used.

Next, proceed with Step S3 and install the multi-section inner wear-resistant tube in the outer protective tube. Preferably, the outer protective tube wall thickness is 1.6-2.2 mm; the inner wear-resistant tube wall thickness is 2.4-3.5 mm.

In this embodiment, when installed, the outer protective tube is placed vertically, and the multi-section inner wear-resistant tube is pressed into the outer protective tube from one end of the outer protective tube.

After the inner wear-resistant tube is installed into the outer protective tube, the wear flanges are installed at both ends of the outer protective tube respectively, each of which includes an outer protective flange and an inner wear layer.

In this embodiment, the sum of the thickness of the tube wall of the outer protective tube and the inner wear-resistant tube is less than or equal to 5.5 mm, preferably less than or equal to 4.5 mm.

Wear-Resistant Experiment

The wear-resistant performance of the wear-resistant tube prepared by the method of the invention is much higher than that of the existing tube.

The wear-resistant performance of the wear-resistant tube is described by the applicant in the following table through wear-resistant experiments.

The wear experiment was carried out by installing the wear-resistant tube onto the concrete conveyor pump and delivering the concrete pump at a predetermined pressure.

| | Wall thickness | Pressure | Concrete model | Square |
|---|---|---|---|---|
| Inner wear-resistant pipes adopt end-high-chromium cast iron, central conventional 60Mn steel (normal tube) | 4.5 mm | 7 MPa | C30 | Multiple averages of about 31,000 squares |
| | 5.5 mm | | | Multiple averages of about 39,000 squares |
| Inner wear-resistant pipe with end high-chromium cast iron cast pipe, central GCr15 steel pipe (tube of the invention) | 4.5 mm | 7 MPa | C30 | Multiple averages of about 60,000 squares |
| | 5.5 mm | | | Multiple averages of about 81,000 squares |

From the above experiments, it can be seen that the method of the present invention can improve the life of the straight tube to its 2 times. This is a disruptive improvement in the field of wear-resistant direct tubes.

In addition, the tube of the present invention in the course of use, wear uniformity is very good, there has never been a central tube has been worn through and the end tube is almost intact, or the end tube has been worn through and the central tube is almost intact.

Proportion

In fact, in the course of experiments, because of the high hardness of high carbon high-chromium steel, brittleness, the process of its rolling is difficult, and the main problem is that high carbon high-chromium alloy steel in the process of rolling, is prone to cracking, and in the welding process tends to appear a phenomenon of collapse. These mainly occur during the preparation of the inner tube, so this emphasis is only on describing the preparation process of the inner tube as a comparison.

A length of 1000 mm, width of 390 mm high carbon high-chromium tube steel plate is obtained by forging and machining.

At 750-800° C., the high carbon and high-chromium alloy steel plate is balled out. Preferably, the temperature of the spheroidize annealing is 760° C., 770° C., or 780° C.

The annealed high carbon high-chromium steel plate is rolled in the direction of its width through the rolling machine, which is rolled into a ring with a diameter of 124 mm.

Then, the bent-shaped steel plate is welded and heated so that its ends are melted to a molten state, with hot-melt welding at both ends of the bent plate and the ends welded together as a central inner wear-resistant tube section. In this embodiment, the way of welding is using arc welding or laser welding.

The manufacturing method in this embodiment is exactly the same as the embodiment 2, however, the finish rate of the wear-resistant tube obtained is very low, the main defects include two kinds, one is the steel plate itself appears to crack in the process of rolling, and the other is there tends to appear collapses and cracks at the weld gap.

However, the applicant found that for steel plates with a length of 390 mm on one edge, the yield increased significantly when the length of the high-carbon high-chromium plate become shorter, and when the length of the steel plate was reduced to 300 mm, the finished yield can reach more than 90%, that is to say, reducing the length of the rolled plate can significantly improve the success rate of high carbon high-chromium steel plate.

Since the high-carbon, high-chromium plate (GCr15) is not yet routinely able to produce plate materials larger than 300 mm in width; the applicant then uses a high carbon-high-chromium plate for experiments of less than 300 mm. The yield of a high carbon, high chromium plate 285 mm using the method of the present invention to roll the tube can also reach more than 90%.

Embodiment 3

As mentioned above, the applicant found in the testing of product in embodiment 2 that the product made in embodiment 2 in the process of use, there is a certain substandard rate, the service life of the substandard product will be greatly reduced (the substandard product rate in 5-10% or so). However, the appearance of the substandard product and good products are not any different, but in the course of testing or use, the life is significantly shorter than the good ones.

Through the repeated study of good and substandard products, the applicant accidentally found the reason for the formation of the inferior product, and provides the improvement method of this embodiment.

The method of this embodiment includes the following steps:

Step S1, preparation of outer protective tube.

Protective outer tubes can be made of low alloy steel or medium- and low-carbon steel materials. It can be done with conventional technology, and it is not described here.

Step S2, preparation of the inner wear-resistant tube.

The inner wear-resistant tube in this embodiment is made of high carbon and high chromium.

The steel plates that have been made can be purchased from steel mills and then the steel plates are heat treated, which is treated by spheroidize annealing, with a temperature of 750-800° C.

After the balling annealing, the performance of the plate can meet the requirement of a rolling machine and ready to be rolled. The heat-treated steel plate is cut at its length direction, each section length is left as between 380-400 mm, the length of each section is the same, and then the cut sheet is bent it into a tubular shape using the rolling machine with its long edge as the circumference of the tube, with its short edge as the length of the tubular tube.

Then, the bent tube is weld by hot-melt welding, making its ends to become melt state and welded together, as a section of the inner wear-resistant tube. Repeat this step, preparing a multiple sections of inner wear-resistant tube. In this embodiment, welding methods such as arc welding or laser welding are used.

Next, proceed with Step S3 and install the multiple sections of inner wear-resistant tube in the outer protective tube.

Unlike embodiment 2, in this embodiment, the applicant improves the step S3 to install multiple inner wear-resistant tube sections in the outer protective tube. The improved step 3 includes: Step S3-1: getting a predetermined number (e.g. 2, 3 or 4, etc.) of inner wear-resistant tubes, placing one of the inner wear-resistant tubes outside a vertical cylinder or the like (the outer circle of the cylinder (e.g. four prisms, five prisms, etc.) matches the inner surface of the inner wear-resistant tube and its sections); step S3-2, adhesive is coated on end surface of a first inner wear-resistant tube section; step S3-3, placing a second inner wear-resistant tube section outside the cylinder above the first inner wear-resistant tube section, and then bond it with the first inner wear-resistant tube section; next, repeating Step S3-2 and Step S3-3 to bond to form the inner wear-resistant tube section groups, the inner surfaces of the sections in each inner wear-resistant tube groups are aligned with each other; several inner wear-resistant tube section groups are then loaded from one end into the wear-resistant outer tube. This embodiment can significantly reduce the substandard product rate and improve the life of wear-resistant tubes.

Preferably, in Step S3-2, the procedure of coating adhesive is applied at several points along the end surface of the wear-resistant tube; the thickness of adhesive is 0.1-1 mm, preferably 0.1-0.3 mm. For example, it may coat 4 points at the end surface along the diagonal, and between the points leaving predetermined gaps, which can ensure that the wear-resistant inner tube of the inner surface is aligned with each other, and ensure the concrete filling between the outer tube and the inner.

In another implementation, the applicant makes the following improvements to Step S3, and Step S3 includes: Step S3-1: getting a predetermined number of inner wear-resistant tube sections (e.g. 2, 3 or 4, etc.); Step S3-2: coating adhesive discontinuously at end surface of a first inner wear-resistant tube section; Step S3-3: Bonding a second inner wear-resistant tube section with the first inner wear-resistant tube section; repeating Step S3-2 and Step S3-3 to bond and form the inner wear-resistant tube section groups, in which the inner surface of each section is aligned with others; Inserting an inner wear-resistant tube section group into the protective outer tube, during the process of the inner wear-resistant tube section group is inserted into a part of the protective outer tube, the end of the exposed part of the inner wear-resistant tube section group is coated with adhesive (adhesive for bonding steel), Another bonded inner wear-resistant tube section group is then installed on the inner wear-resistant tube section group coated with adhesive, keeping the inner surfaces of the two inner wear-resistant tube section groups aligned with each other. This embodiment can significantly reduce the substandard product rate and improve the life of wear-resistant tubes.

The test of the substandard product is by installing the wear-resistant straight tube on the concrete pump truck, under the pressure of 7 MPa, the pump truck pump concrete as normal. For the tubes with wall thickness of 4.5 mm and 5.5 mm, tests are done respectively, on the pump truck (same type), through 1000 pieces of the straight tubes with the same length of 3 meters. As tested, it is confirmed that the application of this method, the substandard product rate of the straight tube can be reduced to less than 1%. Here, the substandard product refers to that, as compared with a normal straight tube, the service life of which is less than the normal straight tube life over 30%.

Embodiment 4

The wear-resistant straight tube of this embodiment is an improvement of the wear-resistant tube to embodiment 1 or 3, similar to embodiment 1, the wear-resistant straight tube of this embodiment includes: protective outer tube 1, wear-resistant sleeve flange 2 and wear-resistant inner tube 3.

Figure 9:
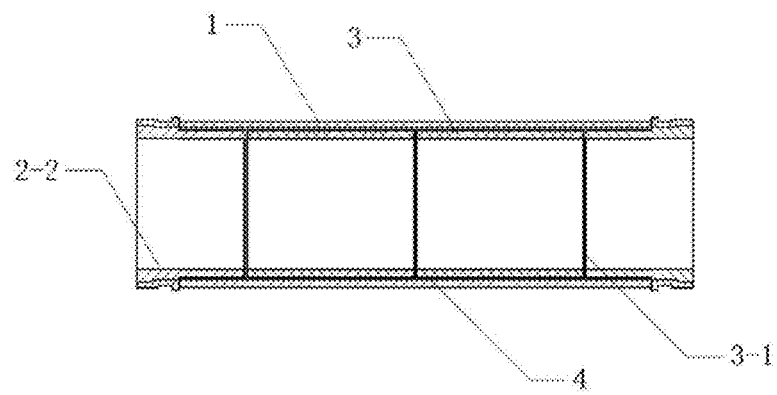
FIG. 9 is a schematic diagram of the wear-resistant tube in embodiment 4 of the present invention.

As shown in FIG. 9, unlike embodiment 1, in this embodiment, wear-resistant flange 2 includes the outer flange 2-1 and the inner wear sleeve 2-2, the inner wear sleeve 2-2 accommodates in the outer flange 2-1 and the inner wear-resistant sleeve at least partially extended into the protective outer tube 1, with the wear-resistant inner tube 3, the protective outer tube 1 and the outer flange welded together.

"The inner wear sleeve at least partially extended into the protective outer tube 1" means that the inner wear sleeve should be longer than the outer flange, the corresponding length of the protective outer tube 1 is longer than the wear-resistant inner tube 3 or the inner wear sleeve 2-2 into the wear-resistant inner tube 3, and then when the outer flange is fixed by way of welding with protective outer tube 1, the welding site is located on the outside of the wear sleeve, do not come into contact with wear-resistant inner tube 3.

The inner wear sleeve should be made of materials not easy to anneal, such as high-chromium cast iron, ceramics or carbide, so that when welding with protective outer tubes, there will be no impact on the tube body, or a relatively small impact on the life of the wear-resistant inner tube without much impact.

The inner wear sleeve 2-2 can be a whole construction, or it can be connected in the order of multiple wear sleeves. In the case of multiple inner wear sleeves 2-2, multiple inner wear covers are connected to each other sequentially.

In this embodiment, the number of inner wear sleeves is 4. Of course, the number of wear-resistant sleeves in the inner layer can be adjusted appropriately, for example, in the 3-12 range as needed, the length of each inner wear sleeve is less than 50 mm. Preferably, the length of each inner wear sleeve is between 20-40 mm, more preferably 30 mm and 35 mm.

Although the above combined with the preferred embodiments of the present invention has been described in detail, the technical staff in the art should understand that the above embodiments are only an explanation of the indicative embodiment of the present invention, not the scope of the present invention. The details in the embodiment do not constitute a limitation on the scope of the present invention, without departing from the spirit and scope of the present invention, any apparent changes based on the technical scheme of the present invention, such as the equivalent transformation, simple replacement, etc., fall within the scope of protection of the present invention.

The invention claimed is:
1. A sectional-type high wear-resistant double-layer straight tube for concrete transferring, wherein the two-layer straight tube comprising: protective outer tube, sectional-type wear-resistant inner tube, the protective outer tube nested outside of the sectional-type wear-resistant inner tube, the sectional-type wear-resistant inner tube comprises at least two sections of wear-resistant inner tube, and the sections of wear-resistant inner tube are connected to each other sequentially,
- wherein the sectional-type wear-resistant inner tube at least comprises a left end inner tube section, a right end inner tube section and one or more middle inner tube sections, wherein, the material of at least one of the three kinds of sections is different from that of others;
- wherein, at least one of the middle inner tube sections is rolled steel tube of high carbon high chromium steel, which has been subject to heat treatment by spherical annealing at 750-800° C. and has been bent from a steel plate to a ring-shape using a bending machine,
- wherein, the wear-resistant performance of at least one of the left end inner tube section and the right end inner tube section is better than that of all or part of the middle inner tube sections.

2. The sectional-type high wear-resistant double-layer straight tube for the concrete transport of claim 1, wherein there are filling channels between adjacent inner tube sections at their junction, which is used to fill the gap between the outer tube and the inner tube;
- and the double-layer straight tube also includes a shock absorbing and filling chamber, which is a gap between the outer tube and the sectional-type wear-resistant inner tube, to protect the outer tube and sectional-type wear-resistant inner tube after the outer tube and sectional-type wear-resistant inner tube are installed, the shock absorbing and filling chamber is filled with shock-absorbing filler.

3. The sectional-type high wear-resistant double-layer straight tube for the concrete transport of claim 1, wherein the wear-resistant inner tube is divided into several section groups of wear-resistant inner tube, each section group is pre-assembled together before being installed in the protective outer tube.

4. A sectional-type high wear-resistant double-layer straight tube preparing method, wherein the wear-resistant tube is made to be a double-layer construction, including an outer protective tube and an inner wear-resistant tube, wherein the inner wear-resistant tube consists of two or more sections of wear-resistant tube connected in sequence,
- wherein, the wear-resistant tube preparation method includes the following steps:
- Step S1, preparing the outer protective tube;
- Step S2, preparing multiple sections of the inner wear-resistant tube;
- Step S3, installing the multiple sections of the inner wear-resistant tube into the outer protective tube,
- wherein, the Step S2 includes:
- Step S2.1, preparing or acquiring of steel plates of high carbon high chromium;
- Step S2.2, heat treating the steel plates by spherical annealing, the temperature of the spherical annealing is at 750-800° C.;
- Step S2.3, cutting the steel plate treated according to a predetermined size to produce a steel plate with predetermined size;
- Step S2.4, bending the steel plate with predetermined size to a ring-shape using a bending machine with its long edge used as its circumference, and its short edge as the length of the tube;
- Step S2.5, welding the ends of predetermined size steel plate together, as a section of the inner wear-resistant tube, repeating Steps S2.1-S2.5 and preparing multiple sections of inner wear-resistant tube.

5. The straight tube preparing method of claim 4, wherein the inner wear-resistant tube includes middle inner tube sections and end inner tube sections, and the material of the middle inner tube sections are different from those of end inner tube sections, and the wear-resistant performance of at least one of the left end inner tube section and right end inner tube section is better than all or part of the middle sections.

6. The straight tube preparing method of claim 5, wherein Step S3 also includes pre-assembling of the inner wear-resistant tube and pressing the pre-assembled inner wear-resistant tube from one end of the outer protective tube therein, Step S2 comprises using a cast steel tube of high carbon high chromium material as the end inner tube section, and a rolled steel tube of high carbon high chromium steel as the middle inner tube sections.

7. The straight tube preparing method of claim 6, wherein the sum of thickness of the outer protective tube and the inner wear-resistant tube is less than or equal to 5.5 mm, the high-carbon high-chromium material includes high-chromium steel or cast iron with carbon content above 0.8% and chromium content more than 1.0%.

8. The straight tube preparing method of claim 6, wherein the sum of thickness of the outer protective tube and the inner wear-resistant tube is less than or equal to 4.5 mm, the high-carbon high-chromium material includes high-chromium steel or cast iron with carbon content above 0.8% and chromium content more than 1.0%.

9. The straight tube preparing method of claim 6, wherein the Step S3 includes coating the inner wear-resistant tube before pressing the sections of the inner wear-resistant tube into the outer protective tube one by one.

10. The straight tube preparing method of claim 4, wherein further including a step of leaving a shock-absorbing and filling chamber between the inner wear-resistant tube and the outer protective tube, wherein the shock-absorbing filling and chamber is filled with filling materials, which is water-soluble filler and will be fused together with concrete after the tube is used to pump concrete, and then become solidified.

* * * * *